Patented Jan. 16, 1934

1,943,382

UNITED STATES PATENT OFFICE 1,943,382

ADHESIVE SUBSTANCE

Fred O. Giesecke, Evanston, Ill., assignor to International Patents Development Company, Wilmington, Del., a corporation of Delaware No Drawing. Original application December 26, 1928, Serial No. 328,577, and in Great Britain December 26, 1928. Divided and this application July 20, 1931. Serial No. 552,080

5 Claims. (Cl. 127—32)

This invention relates to an adhesive substance made from corn, useful particularly as a binder or filler or for other analogous purposes, which consists of gelatinized starch, dextrine, gluten, and a small amount of cellulosic material, the hull or fibrous constituent of the corn.

The product when mixed with cold water will absorb a considerable quantity of the water and take on a generally colloidal character. The percentage of soluble substances in the product will ordinarily be low although this factor may be varied as desired. The character of the product may also be varied in other respects by variation quantitatively of the ingredients of the raw material and by changing, within certain limits, the conditions under which the material is treated.

As a raw material it is possible to use a suitable mixture of commercial corn starch, gluten and cellulosic material but for reasons of convenience and economy it is preferable to employ a magma derived, at an intermediate stage, from the process of manufacturing starch from corn, by what is known as the wet method, in which the corn, after being steeped and comminuted, is subjected to a series of separating operations in water. The first of these operations involves the elimination and washing of the germ of the corn. The second operation is known as the "coarse slop" separation and involves the removal of the bulk of and the larger particles of the hull or bran. According to the usual wet method of making corn starch the starch milk from the coarse slop separation is subjected to a "fine slop" separation in a series of silk reels or shakers to remove from the starch and gluten mixture the finer bran and fibre particles. The first of the series of silk reels is usually known as a draining reel. The starch and gluten magma passing through the draining reel goes to the starch tables with the liquid from the germ separating and washing operation and the liquid from the other silk reels which may be said to form the fine slop separating system. A process of manufacturing starch of this type is disclosed in United States Patent No. 1,655,395 to Moffett January 3, 1928. Mixtures of starch gluten, bran and fibre tail off from the draining reel and the reels of the fine slop system, these mixtures containing progressively decreasing amounts of starch. These mixtures are commonly called "Fine Slop Tailings" or are sometimes known as "No. 17 tailings" from the fact that the reels (or shakers, as the case may be) are covered with No. 17 silk.

A suitable raw material for the production of the product of this invention may consist of the tailings from the draining reel, that is the first of the series of silk reels. The tailings from one or other of the reels of fine slop system may also be used with some consequent variation in the composition of the product.

Assuming that the material from the draining reel is used, it will contain approximately 44.64% solid substances and 55.36% water (to take a specific example). The water content is reduced by evaporation, pressing or otherwise, to approximately 40% and the material is then treated, preferably, by being subjected to heat and pressure as described in my copending application, Serial No. 328,577, filed December 26, 1928, of which this application is a division in accordance with which method the material is passed through heated rolls closely set together. As a specific example of the apparatus suitable for this purpose the rolls may be hollow, 30 inches in diameter, set 0.005 of an inch apart, revolved at two revolutions per minute, and kept filled with steam at 90 pounds pressure per square inch (331° F.) which will give a superficial temperature in the neighborhood of 300° F. A certain amount of the material is allowed to accumulate in the bight between the rolls and is therefore subjected to some preheating before the application of the pressure.

This treatment produces a gelatinization of the starch and the modification of some of the same into dextrine. Apparently the high temperature and pressure to which the starch granules are subjected, followed by the relief of pressure, brings about a disruption of the starch cells which, however, are closely compressed by the rolls so that the material comes from the rolls in thin friable, flaky sheets of rather dense character which are by preference subsequently ground to reduce the material to a fine powder. This pulverization is to facilitate the mixing of the material with water. In this state the product will absorb several times its weight of water and when mixed with water will form an adhesive paste the bonding qualities of which are improved by presence of the gluten and cellulosic material. The mixture from the draining reel will ordinarily have, to give a specific example a composition as follows on the basis of dry substances:

| | Per cent |
|---|---|
| Starch | 87.16 |
| Protein | 8.62 |
| Soluble substances | 1.49 |
| Ash | 0.68 |
| Oil | 0.83 |
| Fibre | 1.30 |

The acidity (titration with phenol phthalein indicator calculated as HCL) will be approximately .24% and the hydrogen ion concentration pH=4.4.

It will be understood that this analysis is merely typical and the composition may vary considerably according to the character of the corn and the particular method of manufacture.

This material treated with heat and pressure as above described will give a product having substantially the following composition:

| | Per cent |
|---|---|
| Solid substances | 95.42 |
| Moisture | 4.58 |
| Total | 100.00 |

On a dry basis the product consists of:

| | Per cent |
|---|---|
| Starch | 80.73 |
| Protein | 8.83 |
| Soluble substances | 7.95 |
| Dextrine | 6.05 |
| Ash | 0.63 |
| Dextrose | Trace |
| Oil | 0.79 |
| Cellulosic material | 1.25 |

Acidity—0.2%
pH=4.8.
Capacity for water absorption—10.

This means that the material will absorb cold water to the extent of 10 times its own weight.

It will be understood that in the above table the items are not mutually exclusive. The dextrine is largely a soluble substance and the protein soluble to some extent.

A similar product may be made from a tailings mixture from one of the fine slop reels having a composition as follows:

| | Per cent |
|---|---|
| Solid substances | 41.82 |
| Moisture | 58.18 |
| Total | 100.00 |

On a dry basis this material may contain the following ingredients:

| | Per cent |
|---|---|
| Starch | 86.44 |
| Protein | 8.18 |
| Soluble substances | 1.55 |
| Ash | 0.75 |
| Oil | 0.90 |
| Cellulosic material | 1.62 |

Acidity—0.21%
pH=4.3.

This material, if treated as above described, will give a substance characterized as follows:

| | Per cent |
|---|---|
| Solid substances | 92.17 |
| Moisture | 7.83 |

*Dry basis analysis*

| | Per cent |
|---|---|
| Starch | 78.84 |
| Protein | 7.95 |
| Soluble substances | 8.74 |
| Dextrine | 7.10 |
| Ash | 0.82 |
| Dextrose | Trace |
| Oil | 0.82 |
| Fibre | 1.75 |

Acidity—0.197%
pH=4.9
Water absorption—10.

The characteristics of the product may be varied to some extent by variation in the water content of the raw material, and by varying the temperature, pressure, and duration of treatment to which the material is subjected. As the water content of the raw material is increased, within certain limits, the water absorption capacity of the product is increased; but with increase of water content above the amount given as preferred, other factors remaining constant, the material tends to become too light and fluffy. The proportion of dextrinization to gelatinization may be increased by increasing the temperature. As the dextrine content increases the capacity for water absorption decreases.

The amount of water in the finished product will vary in accordance with the duration of the treatment between the rolls and may be further reduced by a subsequent drying step. The ultimate water content is of little importance except to comply with trade customs.

The product may be used advantageously as a binder in briquetting. The cellulosic matter appears to improve the bond. The capacity for water absorption may vary from 5 to 12. The rate of water absorption is somewhat slower than in the case of the products described in my copending applications, Serial No. 552,078, filed July 20, 1931, and Serial No. 552,079, filed July 20, 1931, which contain little or no cellulosic matter.

The product can be manufactured cheaply as an adjunct to the manufacture of starch from corn by the wet method since the material may be obtained ready mixed from the starch manufacture and is a residual material which it is desirable to remove from the starch process because of the relative difficulty in recovering the starch therefrom. However, the wet starch process magma might be modified as to the proportion of its constituents by adding starch, gluten, or cellulose with consequent changes in the character of the product. For example the cellulosic material may vary from one percent to three or four percent. The gluten content may range from two or three percent to nine or ten percent. The dextrine content may be varied from seven to twelve percent. The high water absorption capacity which is one of the characteristic properties of the product is probably due to the fact that the material is treated in a very finely divided state.

No claim is made to the above described process as the process is claimed in the aforesaid application, Serial No. 328,577.

I claim:
1. Gelatinized corn starch product containing substances in approximately the following proportions by weight: starch 78% to 81%; protein 7% to 9%; soluble substances 7% to 9%; dextrine 6% to 8%; oil 0.7% to 0.9%; cellulosic ma- terial 1% to 2%; and having a water absorption capacity of approximately 10.

2. Corn starch product containing gelatinized starch and substances in approximately the following proportions by weight: protein 2% to 10%; dextrine 7% to 12%; cellulosic material 1% to 4%; and having a capacity for water absorption from 5 to 12.

3. Fine slop tailings from the wet process of making corn starch in which the starch is gelatinized in part and dextrinized to the extent of about 6%, contains about 8% to 9% of protein and from 1% to 2% cellulosic matter and has a capacity for absorbing water of about 10 times its weight.

4. Gelatinized corn starch product consisting of compressed individual starch cells gelatinized in part and in part dextrinized and finely divided gluten and cellulosic matter.

5. Gelatinized corn starch product consisting of compressed individual starch cells gelatinized in part and in part dextrinized and finely divided gluten and cellulosic matter, and having a capacity for water absorption of about 10 times its weight.

FRED O. GIESECKE.